Patented Sept. 8, 1936

2,053,329

UNITED STATES PATENT OFFICE 2,053,329

TREATMENT OF CLAYS AND THE LIKE

William Feldenheimer, London, England

No Drawing. Application August 23, 1935, Serial No. 37,531. In Great Britain October 19, 1934

10 Claims. (Cl. 252—8)

This invention relates generally to the treatment of clays and the like, and more particularly to the process of treating such materials in order to improve their color and to prevent recoloration of the clays upon standing in contact with water or upon heating or drying them.

I have found that the color of clays may be improved by treating them with a chromium salt. It is preferred to use a chromous salt, or a chromic salt in the presence of a reducing acid or metal which reduces the chromic salt to a chromous salt. The preferred reducing acid for use in accordance with the present invention is sulphurous acid. If metal is employed to reduce the chromic salt to the chromous state, it is preferred to use zinc although other metals may be employed.

I have found that an American clay from the McIntyre district of Georgia which had been bleached by a compound of hydrosulphurous acid and which although improved in color was not equal to the best clays from some parts of the world, when further treated in water with a small quantity of alkali dichromate to which had been added sufficient $H_2SO_3$ to reduce it, thereby turning the color to colorless or greenish blue in water gave a very much improved colored clay when dry. The amount of dichromate to effect this improvement was small, about 2 lbs. of dichromate to one ton of clay treated.

The same bleached clay when treated with chromic hydroxide dissolved in water containing sulphurous acid also gave improved results.

An English clay from Fraddon, Cornwall, untreated, that is to say simply washed by levigation methods, treated with bichromate of potash and sulphurous acid gave very much improved results on drying. This clay also gave satisfactory improvement in color on treating it with water containing a small quantity of chromous sulphate. The same clay when treated with chromic chloride in water in the presence of zinc also gave improved results.

An American clay from the McIntyre district, Georgia, which had only been washed by the ordinary methods of levigation in water when treated in water with sodium dichromate and sulphurous acid gave an improvement in color. When further treated by a solution of zinc digested in sulphurous acid it gave a further greatly improved color. There was no surface discoloration on the clay or in the water after settling and there was no recoloration of the clay on standing. The same clay treated in water to which had been added dichromate of soda and sulphurous acid in sufficient quantity to bleach it in the presence of zinc was excellently bleached in a short time and there was no recoloration of the clay on standing. On adding lime water to neutralize any excess acidity it gave equally good results as to the color of the clay and freedom from stain.

The above clay when deflocculated in the first instance gave like improved results.

A French clay from Brittany which had been bleached by sulphurous acid and zinc solution improved to a whiter and brighter clay on adding dichromate of soda and sulphurous acid, and adding alkali hypochlorite still further improved it.

A clay from the McIntyre district of Georgia which had been washed by the ordinary levigation methods was treated with a dilute solution of dichromate of soda in water, using 2 to 3 pounds of dichromate of soda per ton of clay treated, to which had been added just sufficient hydrochloric acid to render the solution colorless on standing in the presence of zinc foil. After standing for a few days in contact with the bleaching solution and the zinc foil, the color of the clay was greatly improved.

Instead of using hydrochloric acid as set forth in the last example, I may replace the hydrochloric acid with aluminum chloride and treat the clay with the solution of dichromate of soda to which has been added just sufficient aluminum chloride to render the solution colorless on standing in the presence of zinc foil, the proportion of dichromate of soda being the same as given in the previous example. I have found that the color of the clay likewise is improved upon standing.

The iron content is lowered by treatment of clays as described. The addition of alkali at the end of the treatment in order to neutralize acidity does not recolor the clay. A clay prepared according to this invention, especially if has been purified by deflocculation, for example, before treatment, is by reason of its low iron content and the presence of chromium salts advantageous for incorporation in leather and will aid in a tanning process. Another use is in the surfacing of paper, clays treated in accordance with the present invention having the property of imparting to the paper a high gloss accomplished by a better color than was hitherto attainable, more particularly with American clays.

The quantities of chromium salts required to effect improvement in clay varies with the clays to be treated, and may be ascertained by the trial and error method with a small quantity of the clay which is to be treated.

I have described by way of example several different methods in which the invention may be carried out. It is to be understood, however, that the invention may be otherwise practiced within the scope of the following claims.

I claim:

1. In the treatment of clays and the like to improve their color, the step comprising treating the clay in the wet state with a soluble chromous salt.

2. In the treatment of clays and the like to improve their color, the step comprising treating the clay in the wet state with a soluble chromium salt in the presence of a reducing agent which reduces the chromic salt to a chromous salt.

3. In the treatment of clays and the like to improve their color, the step comprising treating the clay in the wet state with a soluble chromium salt in the presence of a member of the group consisting of sulphurous acid and hydrosulphurous acid.

4. In the treatment of clays and the like to improve their color, the step comprising treating the clay in the wet state with an alkali dichromate in the presence of a member of the group consisting of sulphurous acid and hydrosulphurous acid.

5. In the treatment of clays and the like to improve their color, the step comprising treating the clay in the wet state with an alkali dichromate in the presence of a metal which reduces it to the chromous state.

6. In the treatment of clays and the like to improve their color, the step comprising treating the clay in the wet state with an alkali dichromate in the presence of zinc.

7. In the treatment of clays and the like to improve their color, the step comprising treating the clay in the wet state with a hydrosulphurous acid compound, an alkali dichromate, and sufficient sulphurous acid to reduce the alkali dichromate.

8. In the treatment of clays and the like to improve their color, the step comprising treating the clay in the wet state with an alkali dichromate and sulphurous acid in the presence of zinc.

9. In the treatment of clays and the like to improve their color, the step comprising treating the clay in the wet state with an alkali dichromate, sulphurous acid, zinc, and an alkali hypo-chlorite.

10. In the treatment of clays and the like to improve their color, the step comprising treating the clay in the wet state with an alkali dichromate, zinc, and a member of the group consisting of sulphurous acid and hydrosulphurous acid.

WILLIAM FELDENHEIMER.